April 14, 1931.  A. M. CRAIG  1,800,678
MECHANISM LOCK FOR MOTOR CARS
Filed Dec. 10, 1926
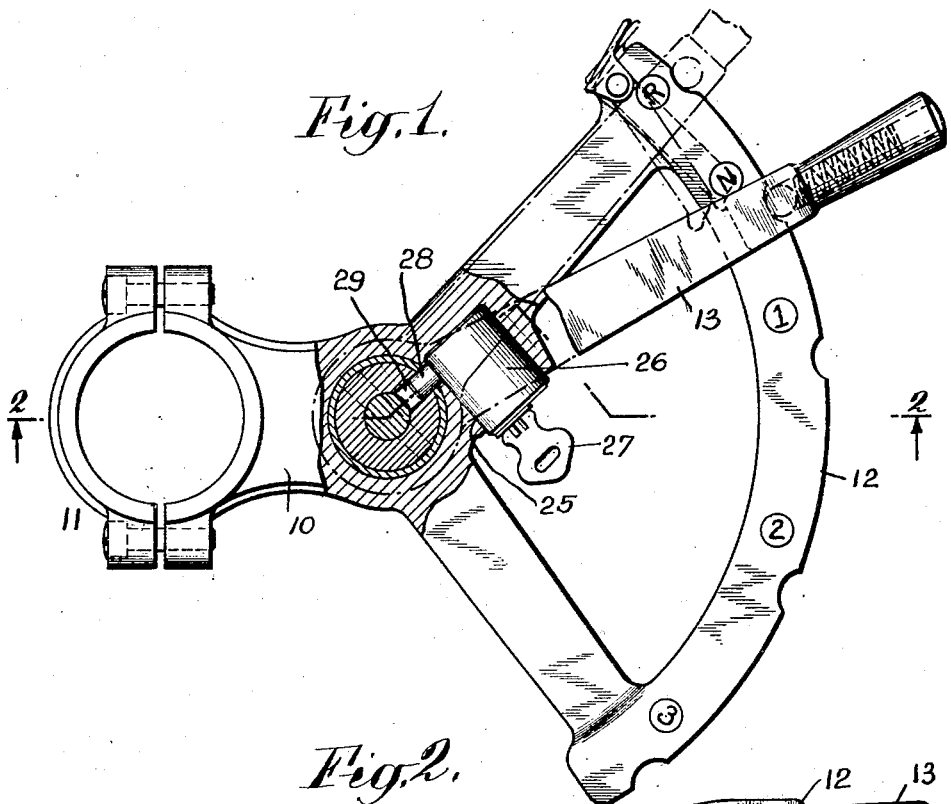
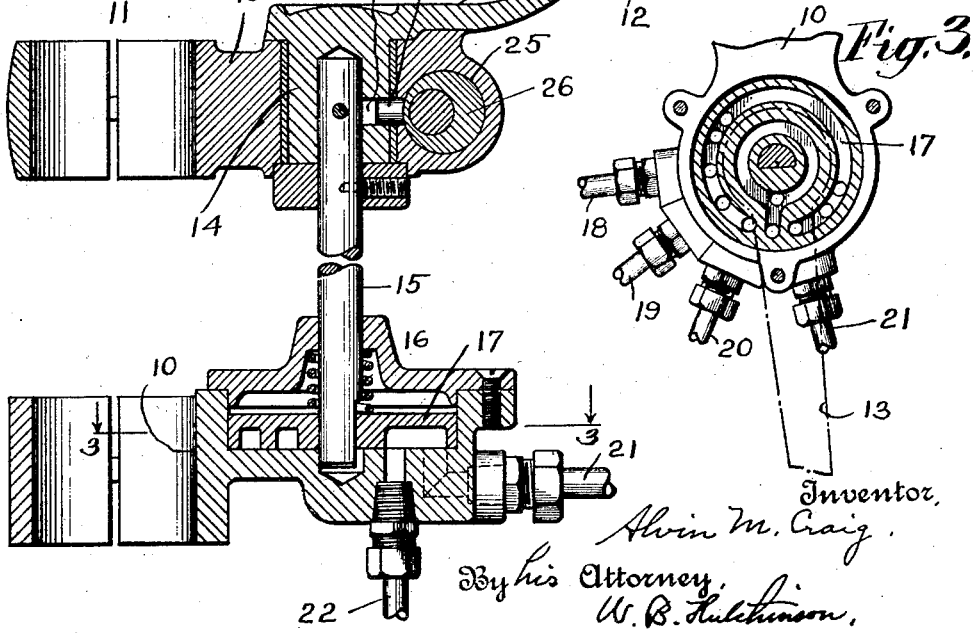
Inventor,
Alvin M. Craig.
By his Attorney,
W. B. Hutchinson.

Patented Apr. 14, 1931

1,800,678

UNITED STATES PATENT OFFICE

ALVIN M. CRAIG, OF NEW HAVEN, CONNECTICUT, ASSIGNOR TO UNIVERSAL GEAR SHIFT CORPORATION, A CORPORATION OF DELAWARE

MECHANISM LOCK FOR MOTOR CARS

Application filed December 10, 1926. Serial No. 153,796.

My invention relates to improvements in locks for the purpose of preventing the theft or unauthorized use of motor cars. My invention is intended to produce a simple locking arrangement which will secure the controlling mechanism of a motor car so that if the car is started in an attempt to steal or use it unlawfully, the driver will have no control of the car. The invention is intended further to construct, arrange and dispose the lock so that if it is smashed in an attempt to steal the car, the breaking of the lock will disrupt the control mechanism so as to render the car unmanageable. The invention is peculiarly adapted for use in connection with a pneumatic gear shift such as shown in my prior application, Serial No. 107,592, filed May 8, 1926, and for locking the control of the pneumatic mechanism against use, and more particularly for locking the controlling lever or handle in neutral position. The invention is not limited to this use, but is best adapted for use in connection with a gear shift of the kind referred to. The invention is also intended to positively lock the controlling handle not only against operative movement but against movement of any kind, so as to hold it rigid. The advantage of the structure and disposition of the lock will appear more clearly from the following description.

Reference is to be had to the accompanying drawings forming a part of this specification, in which similar reference characters indicate corresponding parts in all the views.

Figure 1 is a broken sectional plan of my improved lock as applied to a pneumatic gear shift control.

Figure 2 is a broken vertical section on the line 2—2 of Figure 1, and

Figure 3 is a sectional plan on the line 3—3 of Figure 2.

I have shown my improved lock as applied to the handle of a pneumatic gear shift, and especially one in which the control handle and connections can be conveniently arranged and supported on the steering rod of a car in proximity to the steering wheel. To this end I provide a bracket 10 having means as the clamp 11 for securing it to the steering rod of a car, and this bracket is shown as supporting a quadrant 12 over which moves the control lever 13 adapted to be positioned at various points on the quadrant to control the valve, which in turn controls the operation of the gear shift.

As shown the handle 13 has a substantial hub 14 journaled in the bracket 10 and connected to a valve rod 15 which controls the pneumatic valve 16. This is shown in a general way to illustrate the particular adaptation of my lock, and it shows a valve member 17 which works in connection with ports leading to the pipes 18, 19, 20, 21 and 22, forming the pneumatic connections to the shifting mechanism. Obviously it is not necessary to refer to the details of the valve or to the shifting mechanism, but it will be understood that valves controlled by the rod 15 when turned by the handle 13 can be made to control other operating mechanism of a car without affecting the invention.

My improved lock is intended to secure the handle 13 against movement, and it will be noticed that by providing a bracket 10 and a means for fastening the bracket to a steering rod, the handle and its connections can be disposed immediately beneath the steering wheel of a car. This makes it difficult of access for the purpose of breaking the lock, and also makes it practically certain that if an attempt were made to smash the lock and its connection with the rod 15, it would disrupt, break, or disturb the rod 15, or the bracket 10, or the steering rod with which it connects, so as to render the car unmanageable and therefore incapable of unauthorized driving.

As a convenient means of obtaining this result I recess the bracket 10 as shown at 25, and locate a lock 26 in the recess. The lock itself can be of any approved type. I have shown one of the well known barrel type operated by a key 27 and having a bolt 28 disposed so as to enter a hole 29 in the hub 14 of the handle 13. I preferably arrange the hole so that when it is turned into position to register with the bolt 28, the handle 13 will be in neutral position and the quadrant and the valve 16 will also be in neutral position. By operating the key 27 or its equivalent, the handle can be readily locked or unlocked as shown.

It will be seen that this construction is exceedingly simple, and provides for locating the lock in the advantageous position described, and it will of course be understood that the mechanism controlled by the handle might be different from the pneumatic valve referred to without affecting the invention.

I claim:—

1. The combination with the steering rod of a car and a valve controlling the pneumatic gear shift of the car, said valve being located below the bracket, of a handle having its hub journalled and concealed in the bracket, said hub being connected to the valve stem rod of the aforesaid valve, and a lock having its body enclosed in a recess of the bracket and provided with a bolt which enters a recess in the hub of the handle.

2. The combination with the steering rod of a car and a pneumatic gear shift controlling valve, of a bracket having means for attachment to the steering rod, a handle journaled in the bracket and connected to the valve stem rod of the valve, and a lock recessed in the bracket to lock the journal of the handle therein.

3. The combination of a bracket, a quadrant associated therewith, a handle journaled in the bracket and movable over the major portion of the length of the quadrant, retrievable means associated with said quadrant normally positioned to bring said handle to a positive stop at a certain intermediate position, and a lock recessed in said bracket to lock the journal of the handle therein, said lock being operative only when said handle is in the position defined by aforesaid positive stop.

4. The combination of a bracket, a quadrant associated therewith, a handle journaled in the bracket and movable over the major portion of the length of the quadrant, means associated with said quadrant to bring said handle to a positive stop at a certain position, intermediate the extreme limits of its movement, and a lock recessed in said bracket to lock the journal of the handle therein, said lock being operative only when said handle is in the position defined by aforesaid positive stop.

In testimony whereof, I have signed my name to this specification this 8th day of December, 1926.

ALVIN M. CRAIG.